US009055530B2

(12) United States Patent
HomChaudhuri et al.

(10) Patent No.: US 9,055,530 B2
(45) Date of Patent: Jun. 9, 2015

(54) DYNAMIC SELECTION OF EARLY-RX DURATION DURING NETWORK SLEEP OPERATION

(71) Applicant: QUALCOMM Incorporated, San Diego, CA (US)

(72) Inventors: Sandip HomChaudhuri, San Jose, CA (US); Jason A. Young, Sacramento, CA (US); Arun Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/718,654

(22) Filed: Dec. 18, 2012

(65) Prior Publication Data

US 2014/0064166 A1 Mar. 6, 2014

Related U.S. Application Data

(60) Provisional application No. 61/697,566, filed on Sep. 6, 2012, provisional application No. 61/698,164, filed on Sep. 7, 2012.

(51) Int. Cl.
*H04W 52/02* (2009.01)

(52) U.S. Cl.
CPC ............ *H04W 52/0216* (2013.01); *Y02B 60/50* (2013.01)

(58) Field of Classification Search
CPC ... Y02B 60/60; Y02B 60/50; H04W 52/0216; H04W 52/0209; G06F 1/3203
USPC ................ 370/252, 311, 338; 455/343.2, 574
See application file for complete search history.

(56) References Cited

U.S. PATENT DOCUMENTS

| 7,295,827 | B2 | 11/2007 | Liu et al. | |
|---|---|---|---|---|
| 7,826,408 | B1 * | 11/2010 | Vleugels et al. | 370/328 |
| 7,836,166 | B2 * | 11/2010 | Kuan et al. | 709/224 |
| 8,005,515 | B1 * | 8/2011 | Chhabra et al. | 455/574 |
| 8,160,045 | B1 * | 4/2012 | Chhabra | 370/342 |
| 2004/0058686 | A1 * | 3/2004 | Odman | 455/450 |
| 2004/0258102 | A1 * | 12/2004 | Callaway et al. | 370/511 |
| 2005/0221869 | A1 * | 10/2005 | Liu et al. | 455/574 |
| 2006/0187866 | A1 * | 8/2006 | Werb et al. | 370/311 |
| 2007/0116158 | A1 * | 5/2007 | Guo et al. | 375/343 |

(Continued)

OTHER PUBLICATIONS

Torabi et al. "A Robust Coexistence Scheme for IEEE 802.15.4 Wireless Personal Area Networks", The 8th Annual IEEE Consumer Communications and Networking Conference—Smart Spaces and Personal Area Networks, Jan. 9-12, 2011, pp. 1031-1035, IEEE.*

(Continued)

*Primary Examiner* — Gary Mui
*Assistant Examiner* — Michael Phillips
(74) *Attorney, Agent, or Firm* — Kevin T. Cheatham

(57) ABSTRACT

Systems, methods, and devices for saving power in wireless communications devices are described herein. In some aspects, an apparatus includes a memory unit configured to store wake-up information associated with a wake-up time duration for receiving a beacon signal, and includes a processor operationally coupled to the memory unit. The wake-up time duration identifies a time for the processor to wake-up before an expected arrival time of the next beacon signal. The processor may be configured to retrieve the wake-up information from the memory, and vary, over a period of time, the wake-up time duration based on the wake-up information.

28 Claims, 8 Drawing Sheets

(56) References Cited

U.S. PATENT DOCUMENTS

| | | | |
|---|---|---|---|
| 2008/0084836 A1* | 4/2008 | Baird et al. | 370/311 |
| 2009/0196212 A1* | 8/2009 | Wentink | 370/311 |
| 2010/0080156 A1 | 4/2010 | Nichols et al. | |
| 2010/0100716 A1* | 4/2010 | Scott et al. | 713/1 |
| 2010/0323622 A1* | 12/2010 | Nentwig | 455/63.1 |
| 2011/0069650 A1* | 3/2011 | Singh et al. | 370/311 |
| 2011/0261740 A1* | 10/2011 | Loc et al. | 370/311 |
| 2011/0305264 A1* | 12/2011 | Chhabra et al. | 375/219 |
| 2012/0166839 A1* | 6/2012 | Sodhi et al. | 713/322 |
| 2012/0250537 A1* | 10/2012 | Shatil et al. | 370/252 |
| 2013/0329576 A1* | 12/2013 | Sinha | 370/252 |
| 2013/0329620 A1* | 12/2013 | Kim et al. | 370/311 |
| 2013/0332760 A1* | 12/2013 | Reece et al. | 713/323 |

OTHER PUBLICATIONS

Brzozowski, M., "Energy-efficient means to support short end-to-end delays in wireless sensor networks," http://opus.kobv.de/btu/volltexte/2012/2529/pdf/phd_after_defence.pdf., Jul. 2012, pp. 56-135.

Timmons, et al., "Improving the ultra-low-power performance of IEEE 802.15.6 by adaptive synchronization," Wireless Sensor Systems, IET, 1(3), Sep. 2011, pp. 163-164.

* cited by examiner

DYNAMIC SELECTION OF EARLY-RX DURATION DURING NETWORK SLEEP OPERATION

CROSS-REFERENCE TO RELATED APPLICATIONS

The disclosure claims priority to U.S. Provisional Patent Application No. 61/697,566 filed on Sep. 6, 2012, as well as claims priority to U.S. Provisional Patent Application No. 61/698,164 filed on Sep. 7, 2012 entitled "DYNAMIC SELECTION OF EARLY-RX DURATION DURING NETWORK SLEEP OPERATION," which is assigned to the assignee hereof. The disclosure of the prior application is considered part of, and is incorporated by reference in, this disclosure.

TECHNICAL FIELD

The present application relates generally to wireless communications, and more specifically to systems, methods, and devices for performing collision avoidance in a wireless communication network.

DESCRIPTION OF THE RELATED TECHNOLOGY

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves, for example in the radio, microwave, infra-red, and optical frequency bands. Wireless networks advantageously facilitate user mobility and rapid field deployment when compared to fixed wired networks.

The devices in a wireless network may transmit/receive information between each other. Further, devices that are not actively transmitting/receiving information in the wireless network may enter a sleep (or doze state) to conserve power, where the devices do not actively transmit/receive information in the sleep state. These devices may further wake up periodically for a short period of time to check for periodic messages, for example, beacons which may signal the device to enter an awake state in order to transmit/receive data. Because the device consumes more power in the awake state than in the sleep state, minimizing awake time can be advantageous to minimizing power consumption.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One innovation of this disclosure provides a wireless communications device that includes a memory unit configured to store wake-up information associated with a wake-up time duration for receiving a beacon signal. The device further includes a processor operationally coupled to the memory unit. The processor can be configured to retrieve the wake-up information from the memory, vary, over a period of time, the wake-up time duration based on the wake-up information, wherein the wake-up time duration identifies a time for the processor to wake-up before an expected arrival time of the next beacon signal. In one aspect the processor is further configured to vary the wake-up time duration based on missed beacon information.

In one aspect of the device, the early wake-up time duration is an Early-Rx parameter. In another aspect, the wake-up information includes a target beacon miss rate, and the processor is further configured to determine over a period of time a beacon miss rate and to vary the wake-up time duration based on a comparison of the beacon miss rate and the target beacon miss rate. In one aspect, the wake-up information includes a target beacon miss rate, and the processor is further configured to determine over a period of time a beacon miss rate and to increase the wake-up time duration if the beacon miss rate is greater than or equal to the target beacon miss rate. The wake-up information may include a target beacon miss rate, and the processor is further configured to determine over a period of time a beacon miss rate and to decrease the wake-up time duration if the beacon miss rate is less than the target beacon miss rate by a defined safety margin. In one aspect the wake-up information includes a target beacon miss rate and a no-adjustment time interval, the no-adjustment time interval defining a period of time during which no adjustments to the wake-up time duration are made, and the processor is further configured to determine over a period of time a beacon miss rate, adjust the wake-up time duration based on a comparison of the beacon miss rate and the target beacon miss rate, and if the beacon miss rate is less than the target beacon miss rate, whether a no-adjustment time interval has expired. In one aspect, the wake-up time duration is adjusted in increments of time, each increment being less than or equal to 200 μsec. In another aspect, the wake-up time duration is adjusted in increments of time, each increment being less than or equal to 100 μsec. In another aspect, the wake-up time duration is adjusted in increments of time, each increment of time being less than or equal to 100 milliseconds. In another aspect, the wake-up information includes a target beacon miss rate, and the processor is further configured to determine over a period of time a beacon miss rate and to iteratively increase the duration of the early wake-up time duration if the beacon miss rate is greater than the target beacon miss rate decrease and iteratively decrease the duration of the early wake-up duration if the beacon miss rate is less than the target beacon miss rate. In another aspect, the microprocessor is further configured to, before going to a sleep mode, determine a temperature of the chip and varies the time the microprocessor wakes up based at least in part on the temperature.

In another innovation, an apparatus for wireless communication includes a memory unit configured to store wake-up information associated with an early wake-up time duration that defines when a processor wakes-up before a beacon signal is expected to be received, and a processor operationally coupled to the memory unit, the processor configured to retrieve the wake-up information from the memory and dynamically determine the early wake-up time duration based on at least the wake-up information.

In another innovation, a method of saving power in an apparatus for wireless communication includes storing wake-up information associated with a wake-up time duration for receiving a beacon signal, retrieving the wake-up information from the memory, and varying, over a period of time, the wake-up time duration based on the wake-up information, wherein the wake-up time duration identifies a time for a processor to wake-up before an expected arrival time of the next beacon signal. In one aspect, the method further includes determining over a period of time a beacon miss rate, varying the wake-up time duration based on a comparison of the beacon miss rate and a target beacon miss rate, and if the beacon miss rate is less than the target beacon miss rate, whether a no-adjustment time interval has expired.

In another innovation, an apparatus for wireless communication includes means for storing wake-up information associated with a wake-up time duration for receiving a beacon signal, means for retrieving the wake-up information from the memory, and means for varying, over a period of time, the wake-up time duration based on the wake-up information, wherein the wake-up time duration identifies a time for the processor to wake-up before an expected arrival time of the next beacon signal.

Another innovation includes a non-transitory computer-readable medium comprising code that, when executed, causes an apparatus to store wake-up information associated with a wake-up time duration for receiving a beacon signal, retrieve the wake-up information from the memory, and vary over a period of time, the wake-up time duration based on the wake-up information, wherein the wake-up time duration identifies a time for the processor to wake-up before an expected arrival time of the next beacon signal.

Another innovation includes a wireless communications device having a processor configured to vary, over a period of time, a wake-up time duration, the wake-up time duration identifying a time for the processor to wake-up before an expected arrival time of a next beacon signal.

DETAILED DESCRIPTION

Figure 1:
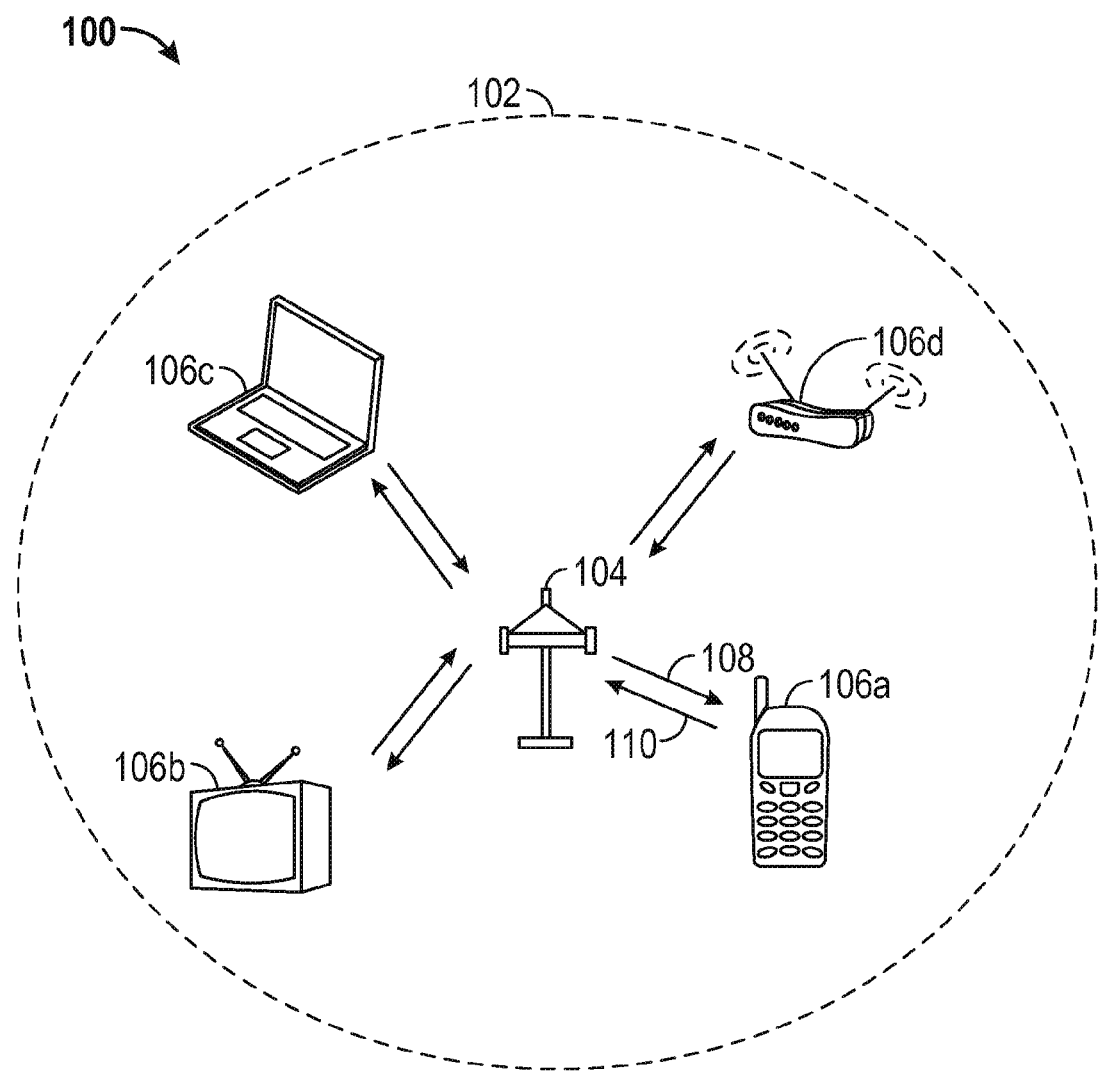
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct—sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (for example, for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106. STAs 106 may include, for example, a laptop computer 106c, a television 106b, a wireless device 106d, and a mobile communication device 106a A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
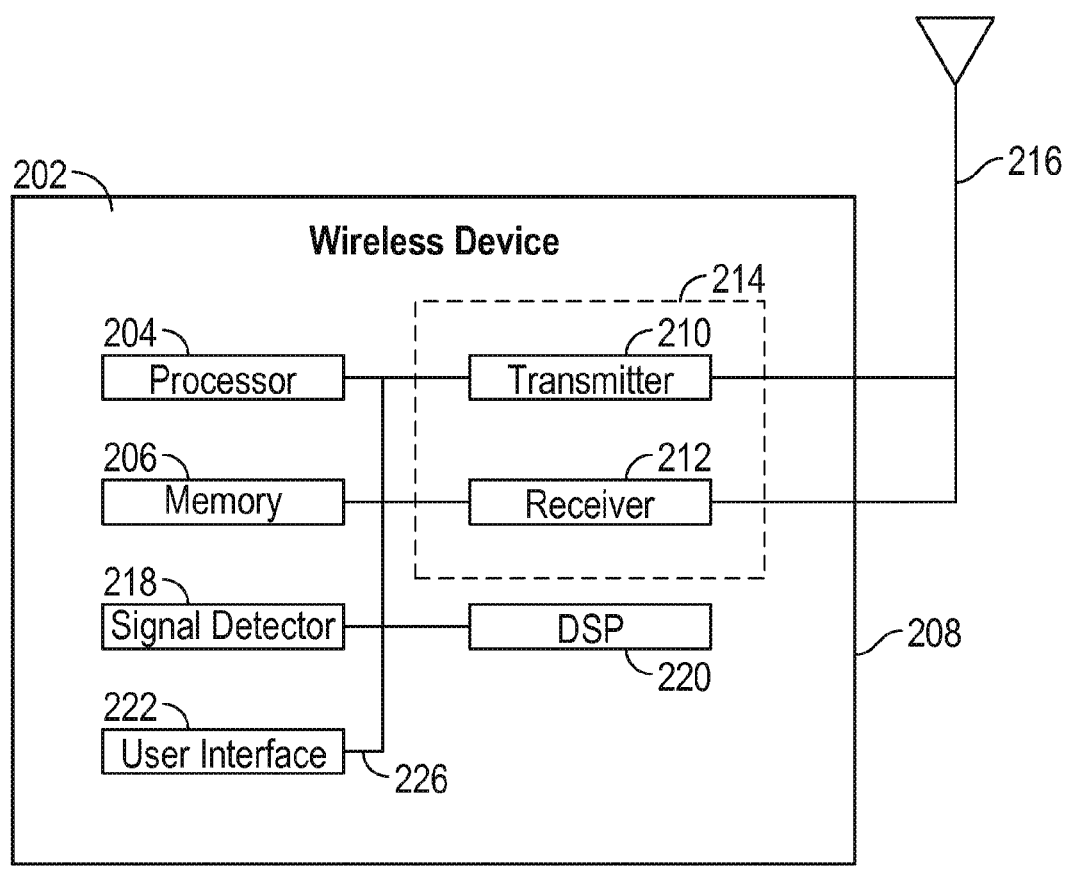
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages, which may be referred to as "paging messages" that are configured to indicate to wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages. The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106, and may be used to transmit and/or receive communications including paging messages. That is, either AP 104 or STA 106 may serve as transmitter or receiver devices of paging messages. Certain aspects contemplate signal detector 218 being used by software running on memory 206 and processor 204 to detect the presence of a transmitter or receiver.

The STA 106 may have a plurality of operational modes. For example, the STA 106 may have a first operational mode referred to as an active mode. In the active mode, the STA 106 may always be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212 and possibly DSP 220 and signal detector 218 of the STA 106 may operate using reduced power consumption in the doze state. Further, in the power save mode, the STA 106 may occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 may transmit paging messages to a plurality of STAs 106 in a power save mode in the same network as the AP 104, indicating whether or not there is data buffered at the AP 104 for the STAs 106. The STAs 106 may also use this information to determine whether they need to be in an awake state or a doze state. For example, if an STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, paging messages may comprise a bitmap (not shown), such as a traffic identification map (TIM). In certain such aspects, the bitmap may comprise a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state). Accordingly, the size of the bitmap may be directly proportional to the number of STAs 106 in the wireless communications system 100. Therefore, a large number of STAs 106 in the wireless communications system 100 may result in a large bitmap.

Processors and devices may use a large amount of power to wake up from a sleep state (or a low operating power saving state) and check for and receive incoming signals (for example, beacon signals) alerting the devices of incoming data that is waiting to be sent to a device. For example, a delivery traffic indication message (DTIM) is a kind of traffic indication message (TIM) which informs a client (device) about the presence of buffered date on an AP. It may be generated within a periodic beacon at a frequency specified by the DTIM interval. In some implementations, in a wireless device, the power used to receive DTIMs ("DTIM power") may be the most critical parameter, or a Key Performance Indicator (KPI), for battery powered devices. In some examples, beacons can be received every 100 ms. Accordingly, the device may wake up every 100 ms to receive the signal, and then if nothing else is needed, goes back into a sleep state. In some implementations, in a power-save mode a device may awaken to receive every other beacon. The incoming signals can be sent at a consistent periodicity, although various network system errors may cause variations in the exactly when the signals are sent/received. Most of the time an incoming beacon signal does not indicate that data is waiting to be received. In addition, if a beacon signal is missed if the device receives the next beacon signal (for example, 100 ms later) the impact on communications is likely to be minimal. Beacons are used to synchronize wireless network communications. Accordingly, if a device is in a power-save operational mode where it does not awaken to receive every beacon, the clock error may increase because it is synchronized less frequently.

Different clocks may be used by a wireless device during its different operational stages. Such clocks may exhibit various inaccuracies sometimes referred to as "clock drift." In some implementations, clock drift may be caused be crystal inaccuracy. For example, during "awake" state, the device may use a clock with very strict accuracy (as low as 20 parts per million drift), whereas during a doze or sleep state, the device may deactivate the higher accuracy clock and use a lower accuracy clock in order to reduce power consumption. In some implementations, a lower accuracy clock may have up to or even higher than 1000 parts per million (time) clock draft). Furthermore, a clock drift value may change depending on various factors, including the ambient thermal conditions of the clock hardware. The changes to clock drift due to temperature may be characterized by a temperature coefficient ("tempco") or another representative parameter, and may be about 250 ppm/C (i.e., 250 parts per million per degree Celsius change) in some implementations. Accordingly, a clock used by a device while in a sleep state will often not be perfectly accurate, which may lead to variations in when the device determines it is time to wake-up to receive an expected signal having an expected incoming signal periodicity.

To ensure the device wakes-up early enough to receive a periodic incoming signal, an error factor sometimes referred to as a clock or wake-up "slop" factor may be determined (for example, based on testing) to compensate for the clock error. In some implementations, the determined slop factor is set time of sufficient duration so that the device wakes up early enough to receive the incoming signal despite the device's internal clock being inaccurate. However, because a device may wake up many times a second (for example, ten times per second) over time waking up too early may consume a large amount of power during the extra awake time, and thus the device may waste a lot of power waiting to receive an incoming signal in an awake state. The duration of time a device wakes up early before receiving an expected periodic incoming signal may be referred to as "Early-Rx."

In particular, the power that a device consumes to wake up to receive periodic signals or beacons (sometimes referred to as delivery traffic indication message (DTIM) power) may be directly affected by an Early-Rx duration that is used to compensate for clock drift, and any other additional implementation delays that may occur (for example, to synchronize MAC, BB and SOC's clock domains) related to receiving the incoming periodic signal. In some examples, when all of these factors are accounted, the uncertainty of when the next periodic signal will be received may result in having up to about 600 microseconds of Early-Rx to ensure the incoming signal is received. In some implementations, the duration of the Early-Rx can be 40+% of total "up" time (~1.4 ms) of a receiver to receive a typical 150 byte beacon. While a higher accuracy clock having a lower ppm clock drift may be used to shorten the length of Early-Rx, it may not be feasible to use a lower ppm clock in sleep mode due to cost, power consumption, and/or chip architecture reasons.

Accordingly, a device or process for dynamically adjusting the time a device should wake up prior to receiving a beacon signal to minimize awake time, while also minimizing the number of missed beacon signals within a certain acceptable range, can save a large amount of power. Dynamically adjusting how early a device wakes up to receive a periodic signal and may also result in virtually no noticeable change in performance by the user of the device. In some implementations the early wake up time period (e.g., Early-Rx) from a sleep mode (for example, a network sleep mode) may be changed, dynamically increased or decreased, based on certain measured or determined information. For example, the measured or determined information may include one or more of the number of missed beacon signals, a threshold of acceptable missed beacon signals, and/or temperature of the chip that includes the clock.

In some implementations, an Early-Rx (or early wake up duration) can be set at a minimum value and not adjusted if beacon signals are not being missed, or not adjusted if beacon signals are being missed at an acceptable rate as defined by a missed beacon parameter. Also, the temperature of a chip (processor) that includes a clock, or other component which may be affected by temperature, may be determined and may be used in calculating the Early-Rx. For example, temperature information may be used to determine whether the wake up duration should be increased, decreased, kept the same, or is not needed at all (e.g., set to a minimum value or zero). In some implementations, an Early-Rx adjustment may be set at every beacon reception, allowing the device to react quickly to changing conditions of the network, the device, or the environment. In other implementations, other factors may be used to control the adjustment of Early-Rx such that an Early-Rx is set less often than every beacon.

In some implementations, a processor (or more generally a wireless device) may be configured with a process to dynamically adjust Early-Rx based on certain customer facing end-goal and as long as the end goals are satisfied. In some implementations, adaptive logic can be used, based on a clock or Low Power Oscillator (LPO) characterization, to decide whether to dynamically adjust Early-Rx or not. Such dynamic adjustment may be based at least in-part on a DTIM threshold and/or based at least in-part on thermal conditions of the clock/LPO, for example, ambient environmental conditions surrounding the chip containing the clock/LPO or heat generated by the chip containing the clock/LPO. That is, if environmental temperatures are extreme (hot or cold), such temperatures may cause or contribute to a significant increase in clock drift. For less severe thermal conditions, the clock drift may be minimal and no compensation based on temperature may be necessary. Likewise, if a chip is awake and active for longer periods of time, the heat created by the chip itself may affect clock drift.

In some implementations, a process for saving power when receiving periodic beacons or other signals (both referred to as beacons for clarity of the description) by adjusting Early-Rx can first include determining a threshold related to an acceptable amount of beacons that are missed. In other words, in what can be characterized as a first level of logic, an acceptable number of missed delivery traffic indication messages (DTIM) can be determined and set to a certain value N. The value N can be based on an operational limit (e.g., from a performance metric, a user or vendor specification, or a standard) at which compensation for clock inaccuracy is deemed necessary or desired. Accordingly, in some implementations an Early-Rx compensation may begin if a certain number of delivery traffic indication messages are missed.

In some implementations, for a smaller DTIM, a second level of logic may be triggered based on the premise that any clock drift is small enough that the effect of the clock drift is already sufficiently absorbed by TBTT deviations a transmitter (for example, an access point) experiences with the beacon transmission. In such cases, a process may include no clock compensation, and an Early-Rx value (sometimes characterized as "sleep slop value") is set to zero (0). The process can be configured for a desired beacon miss rate. In some implementations, the desired beacon miss rate can be provided by a user, or configured into the device (for example, on a processor of the device), or it can be a value that is received by the device and used to configure the beacon miss rate of the device. For example, the Early-Rx can be (incrementally) set higher (waking up a receiver earlier) until the desired beacon miss rate is achieved. If fewer beacons are missed than the target beacon miss rate, the Early-Rx value can be decreased, for example, decreased incrementally towards or to zero (0). The device clock is typically re-synchronized when a beacon is received. Accordingly, if DTIM is greater than (or greater than or equal to) the determined threshold of missed beacons, a general clock compensation technique may be used as the sleep interval is long enough to potentially introduce detrimental clock drift.

In some implementations, a wireless device (or a processor) can use a dynamic selection of a time period (Early-Rx) that can be in addition to a fixed pre-Rx time period to wake up from a sleep mode (for example, a network sleep mode) to receive a beacon. In other words, the device can be configured with a certain pre-Rx time duration to wake up prior to the time it expects to receive a beacon. The pre-Rx time period can account for receiver and/or processor wake up time operations that are determined by the configuration of the components themselves, rather than inaccuracies in a clock. Then in addition to the pre-Rx period, a dynamic Early-Rx period can be defined that is based on certain measured or determined parameters. In investigating this technology, experiments have been conducted to identify how early the chip wakes up during a DTIM=1 Network Sleep event. In other words, what is the time duration of an wake-up period for a chip before the chip is expected to receive a beacon. This Early-Rx duration may be necessary to provide a cushion for various timing discrepancies in the system caused by, for example, local clock drifts during the network sleeping interval, AP's clock drift, AP's TBTT delays due to network congestion, local hardware block synchronization, etc.

In one example, for a typical 150 byte beacon, which can be received in about 1.4 milliseconds, close to about 600 microseconds or more are used as pre-RX (i.e., an early wake-up duration of time). Algorithms are disclosed herein for dynamically selecting an Early-Rx window, which may be set to zero (0) microseconds in some implementations.

In some implementations, the Early-Rx value can been broken down into two main components: (i) Early-Rx related to the WLAN subsystem (i.e., "MAC Early-Rx") and (ii) Early-Rx related to the system-on-chip (SOC) subsystem (i.e., "SOC Early Rx"). MAC Early-Rx relates to how early the device should wake up and start receiving data from the air interface and helps to compensate for inaccuracies resulting from STA's LPO drift, AP's clock drift, internal MAC-SOC synchronization delays. SOC Early Rx relates to how early the MAC should inform the SOC's clock logic to switch on the primary XTAL so that the active "awake" mode clock can be made ready. Due to its nature, the SOC "Early-Rx" will always precede the MAC's Early-Rx.

The different components of MAC Early-Rx can include the clock or LPO accuracy and a fixed delay period. In some examples the clock/LPO accuracy may be 100 microseconds (from a 1000 ppm clock) which accounts for crystal drift over time. The fixed delay period can be set to a value such as 400 microseconds to account for internal MAC and SOC clock domain synchronization. A computed Early-Rx value may be directly programmed into the hardware timer registers. SOC "Early-Rx" can account for XTAL (crystal) to settle from the DEEP SLEEP condition where the XTAL was completely shut-down. The time is commensurate with XTAL Settle time. Therefore, the total Early-Rx may be MAC Early Rx+SOC Early Rx.

In some implementations there is no need to compensate for clock accuracy or fixed delay. In some cases, there may not be any perceivable temperature variation over a 100 Time Units (TU) interval. In some implementations, for up to DTIM=N there may not be a need to compensate for clock drift or fixed delay. This may be because the marginal clock drift is already absorbed within the drifts on the remote AP, resulting in slightly delayed beacon transmission. In some networks, beacons are never sent out exactly at TBTT. By varying the Early-Rx, for example dynamically varying the Early-Rx based on missed incoming signals (e.g., beacons) and/or based on temperature of the chip, it may be possible to save power based in these circumstances.

In some implementations, MAC Early Rx can be set to zero (0) up to an N DTIM interval. In some implementations, a fixed delay may be set to zero (0) for all DTIM intervals. Note that SOC Early Rx can still be needed, for example, set to about 2 ms.

Accordingly, in some implementations we can use an innovative process where we modulate the MAC EARLY RX duration dynamically, contingent on meeting a target beacon miss rate. Wireless devices and processors can use such processes and methods to conserve power. In some implementations there is no point designing for 0% beacon miss rate. Instead, a flexible beacon miss rate percentage can be used. Experiments with particular components can determine an inflexion point "N" at which point clock compensation needs to be introduced. Furthermore, in some implementations the absolute drift can be predicted before compensating for clock drift, from a temperature read and knowing a thermal-coefficient associated with the LPO In some implementations in determining an Early-Rx, the beacons that are missed are counted and a missed beacon rate is derived. In some implementations, a missed beacon rate only based on beacon misses arising out of timing sloppiness and inaccuracies may be used, and other beacon failures due to physical channel adversities, which results in integrity check failure of the Frame Check Sequence (FCS) are not used in the computation of beacon miss rate. In some implementations, decision logic, implemented in software or in a hardware circuit, can be used to characterize every missed beacon as arising out timing inaccuracies or physical channel adversities and directly feed into the running beacon miss counter.

The characterization of beacon miss can be done in several ways. In one implementation, the decision logic would interact with the physical (PHY) layer processing of the frames to identify if the PHY was able to synchronize with the Preamble of the frame around the target beacon transmission time (TBTT). Such synchronization can be detected by observing the self-correlation score of the L-STF (Legacy-Short Training Field) sequence. If no such synchronization happened around TBTT and a beacon was then deemed missed, such a beacon miss can be attributed to timing sloppiness and can contribute to an increase in the running BMISS counter. If instead the PHY processing indicated the presence of a "beacon-like" frame around the TBTT time and yet the beacon was missed, such a miss can be attributed to a physical channel adversity resulting in failure to meet the frame integrity check. Such a miss can be discounted from the running BMISS counter. A "beacon-like" frame can be construed by the low rate of the beacon (typically 1 MBPS in 2.4 GHz operational mode of wireless LAN networks or 6 mbps, in a 5 GHz operational mode of wireless LAN networks). It is to be noted that by virtue of more robust modulation and coding of the Preamble, the likelihood of detecting fields correctly within a Preamble is much higher than the data fields that follows right after. Furthermore, a time-threshold "x" can be used to also characterize the beacon misses. If the device has been in "awake" state at least an "x" amount of time prior to an expected TBTT and yet the beacon was missed, such a beacon miss can be safely characterized due to physical adversity rather than timing sloppiness. This "x" amount of time helps to address the situation where the device already moved out of the "doze" state (or less accurate LPO clock regime) sufficiently earlier to cause any beacon miss. Such concepts are illustrated in the flowchart of FIG. 3A and in FIG. 6.

Various implementations can include all or some of the following features of a power-conserving process. The acceptable amount of missed beacons may be determined and a target beacon miss rate may be identified. In some implementations, a target beacon miss rate is based on operational requirements. For example, the target beacon miss rate may be set to 0.8%. In some implementations, the target beacons miss rate is changeable by communicating a desired target beacon miss rate to a device implementing this power-saving process.

Figure 3A:
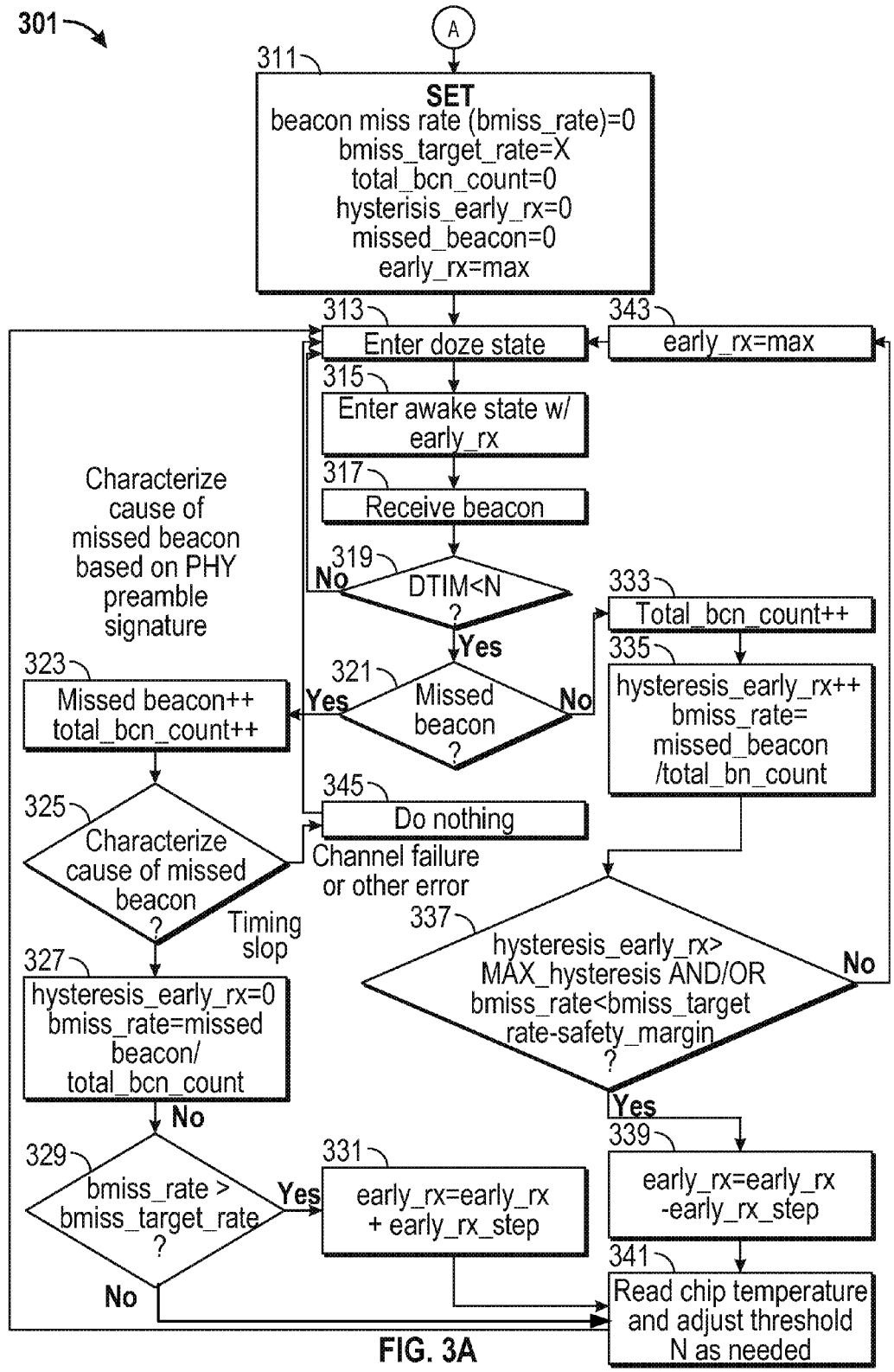
FIG. 3A is a flowchart that illustrates an example of one implementation of a process of dynamically determining an Early-Rx.

FIG. 3A is a flowchart that illustrates an example of one implementation of a process 301 of dynamically determining an Early-Rx on a wireless communication device. The process 301 can be implemented in software, hardware, or a combination of hardware and software. The process 301 can be incorporated on a processor or more than one processing component. Also, the process 301 and any hardware the process is implemented on can receive inputs form other components, for example, to provide measured values or parameters, including but not limited to the number of missed beacons, chip or component temperature, or initialization values and parameters. In various implementations, different initialization values may be used, one or more of the parts of the process may be deleted, or additional parts may be added. In the example illustrated in FIG. 3A, the process 301 may be entered at "A" and proceeds to block 311 where certain initializations are performed. The beacon miss rate (bmiss_rate) may be set to zero. The beacon miss target rate (bmiss_target_rate) may be set to a selected variable X. In some implementations, the beacon miss rate may be set to a beacons miss rate that is related to an operational requirement or a desired performance criteria. The total beacons that may be received (total_bcn_count) may also be set to zero. Note that in this implementation the total_bcn_count refers to the total beacons that impinge on the device and includes beacons that are missed, as determined in block 321 of process 301. A hysteresis variable hysteresis_early_rx may be set to zero. The number of missed beacons (missed_beacon) may be set to zero. A variable that indicates the length of time (or duration) of the Early-Rx (early_rx) is set to a maximum value "max."

The process 301 then proceeds to block 313 where the process enters a doze or sleep state. This step can correspond to the device or a processor running the process entering a doze or sleep state. At block 315, process 301 enters an awake state based at least partially on the early_rx value, such that the process 301 wakes up at a certain time before which a beacon is expected to be received. In some implementations, the time that the process wakes up may also be based on a Pre-Rx value, which is typically not dynamic. At block 317 a beacon is received. At block 319, DTIM is compared to a threshold value N. In some implementations, adjusting early-rx can include determining a threshold related to an acceptable amount of beacons that are missed. In other words, in what can be characterized as a first level of logic, an acceptable number of missed delivery traffic indication messages (DTIM) can be determined and set to a certain value N. The value N can be based on an operational limit based on, for example, a performance metric, a user or vendor specification, or a standard, at which compensation for clock inaccuracy is deemed necessary or desired. Accordingly, in some implementations an early-rx compensation may begin if a certain number of delivery traffic indication messages are missed. As illustrated in this example, the comparison determines if DTIM is less than N (in other implementations the comparison may be determining if DTIM is less than or equal to N, where N is a variable threshold value). In other words, a comparison is made of the number of messages that the wireless device receives (indicating that there is some information to download) to determine if that number is less than a threshold value. For example, during the time period from 2 AM to 5 AM there may be very few incoming messages, and DTM may be less than the threshold value N.

Continuing to block 321, the process checks to see if a beacon was missed. Beacon miss information may be provided by a hardware component of the wireless device, or it may be provided by another process running on the device. If a beacon was missed, the process 301 proceeds to block 323. At block 323 missed_beacon and total_beacon_received are both incremented. The process 301 then proceeds to block 325 where the process 301 determines if the beacon was missed because of timing slop (for example, a fault of the device such as an inaccurate clock) or channel failure (which is not the fault of the device). If it was due to timing slop, process 301 continues to block 327 where hysteresis_early_rx is set to zero (0) and bmiss_rate is set to missed_beacon/total_bcn_count. Then at block 329, process 301 checks if bmiss_rate>bmiss_target_rate. If it is (yes), then at block 331 early_rx is set to early_rx+early_rx_step (that is, early_rx is increased). The process 301 continues to block 341 where the chip temperature is read, and the threshold N may be adjusted based on the chip temperature. Then process 301 reverts back to block 313 and enters a doze state. At block 325 if channel failure caused the missed beacon process 301 proceeds to revert back through block 345 where no changes are made to the process or variables, and the process 301 continues to block 313 where it enters a doze state. In this part of the process, no changes are made to the (e.g., to variables or parameters) because of the determination that the failure was due to something other what can be controlled on the device. In some implementations, other action may take place at block 345, for example, sending an alert if channel failures continued to occur at an abnormal or unacceptable rate.

At block 321 if a beacon was not missed (No), the process 301 proceeds to block 333 where the total_bcn_count is incremented (increased). At block 335 bmiss_rate is set to missed_beacon/total_bcn_count. The process 301 continues to decision block 337 where it determines if hysteresis_early_rx>MAX_hysteresis AND/OR if bmiss_rate<bmiss_target_rate–safety_margin. The hysteresis_early_rx refers to a hysteresis value that can indicate an amount of time that an early_rx has been at the same value. The safety_margin value is a value that affects how long the early_rx value is maintained at the same value even though the beacon miss rate is less than or equal to the beacon target miss rate, allowing a certain level of stability of the early_rx value. MAX_hysteresis represents the maximum value of hysteresis_early_rx. If in block 337 either of these are true, the process 301 continues to block 339 and early_rx is set to early_rx–early_rx_step. That is, early_rx is decreased by a certain amount of time, for example, 100 or 200 microseconds. Then process 301 continues to block 341 where it reads the chip temperature and adjusts the threshold N value as needed. After block 341, process 301 reverts back to block 313 and enters a doze state. If in block 337 the process determines a "no" for hysteresis_early_rx>MAX_hysteresis AND/OR if bmiss_rate<bmiss_target_rate–safety_margin, the process continues to block 343 where it sets early_rx to a maximum (max) value (for example, the longest duration early_rx) and then process 301 continues to block 313 and enters a doze state. The flowchart illustrated in FIG. 3A starts at a large early_rx time duration and gradually (dynamically) becomes smaller as beacons are not missed. In some implementations early_rx starts at a small duration and gradually increases as additional beacons are missed. In either case, an Early-Rx time duration is dynamically adjusted based on one or more of the factors described herein.

Other implementations are possible. In one implementation, continue with this new DTIM<=N-M threshold until temperature rolls off to the previous "low" temperature value. In another implementation, start decrementing the Early-Rx value from the total clock drift as long as running beacon miss rate<=target miss rate.

In some other implementations, the Early-Rx adjustment needs to happen at every beacon reception to react fast to adverse conditions. The software may set beacon IE filters, which results in the hardware not informing the software of received beacons, making it difficult for the software to keep track of a (running) beacon miss rate metric. In some implementations, the software is incapable of making the fine Early-Rx adjustments to the MAC timing registers in time. In some implementations, a hardware DTIM power saver block can keep track of the running metric and also provide a mechanism to software to pre-program a target miss rate, Early-Rx, "step," beacon target miss rate, hysteresis, safety margin, and clock_ppm parameters a priori. The hardware block may monitor the running beacon miss rate and execute the state machine as defined and writes into the necessary MAC/HW registers directly in preparation of the next beacon.

Figure 3B:
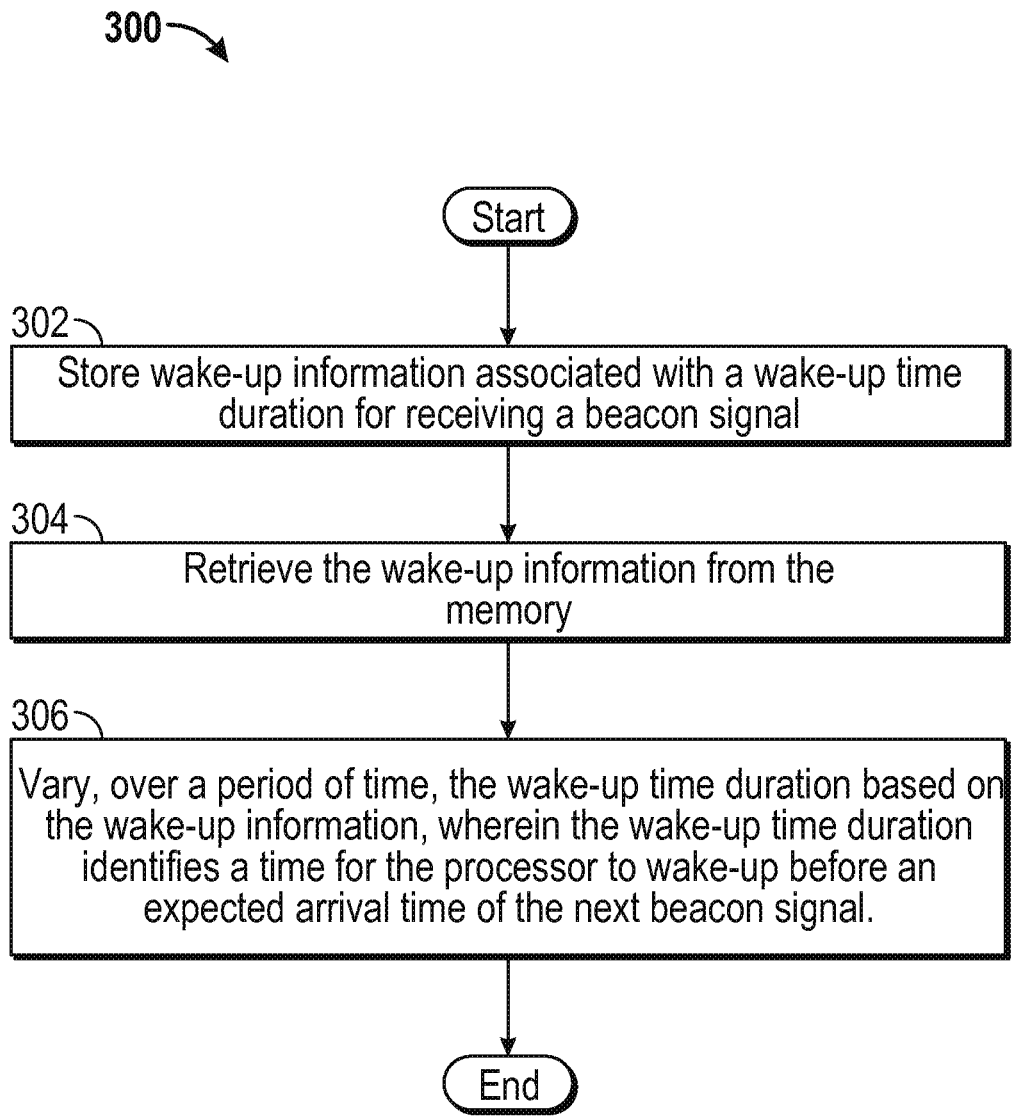
FIG. 3B is a flowchart of a process for varying an early wake-up duration during a network sleep operation.

FIG. 3B is a flowchart of a process 300 for varying an early wake-up duration during a network sleep operation. Such a process can be implemented and performed in a processor (or chip), in a device such as the example of a device illustrated in FIG. 2, or in any device that includes wake-up functionality to receive a signal from any source (local or remote). For clarity of description of the process 300, the process 300 will be described as being performed on a "device," intending device as used herein to indicate a device, a processor, a chip, or any type of electronic circuit in which the process 300 may be implemented.

At block 302, wake-up information associated with a wake-up time duration is stored in memory. In some implementations, the stored wake-up information can indicate, or be representative of, a target miss rate for a beacon signal. In some implementations, the stored information can include information related to temperature of a chip, clock accuracy, and/or a time interval (amount) at which a wake-up duration will be adjusted, for example, increased or decreased by a period of time (for example, 100 or 200 μs). At block 304 the process 300 retrieves the wake-up information from the memory. This may be performed, for example, by a processor retrieving the information from a memory unit in communication with the processor. At block 306 the process 300 varies (or changes) over a period of time, the wake-up duration based at least in part on the wake-up information. The wake-up duration identifies an amount of time for a processor to wake-up before the expected arrival time of a next beacon signal.

Figure 3C:
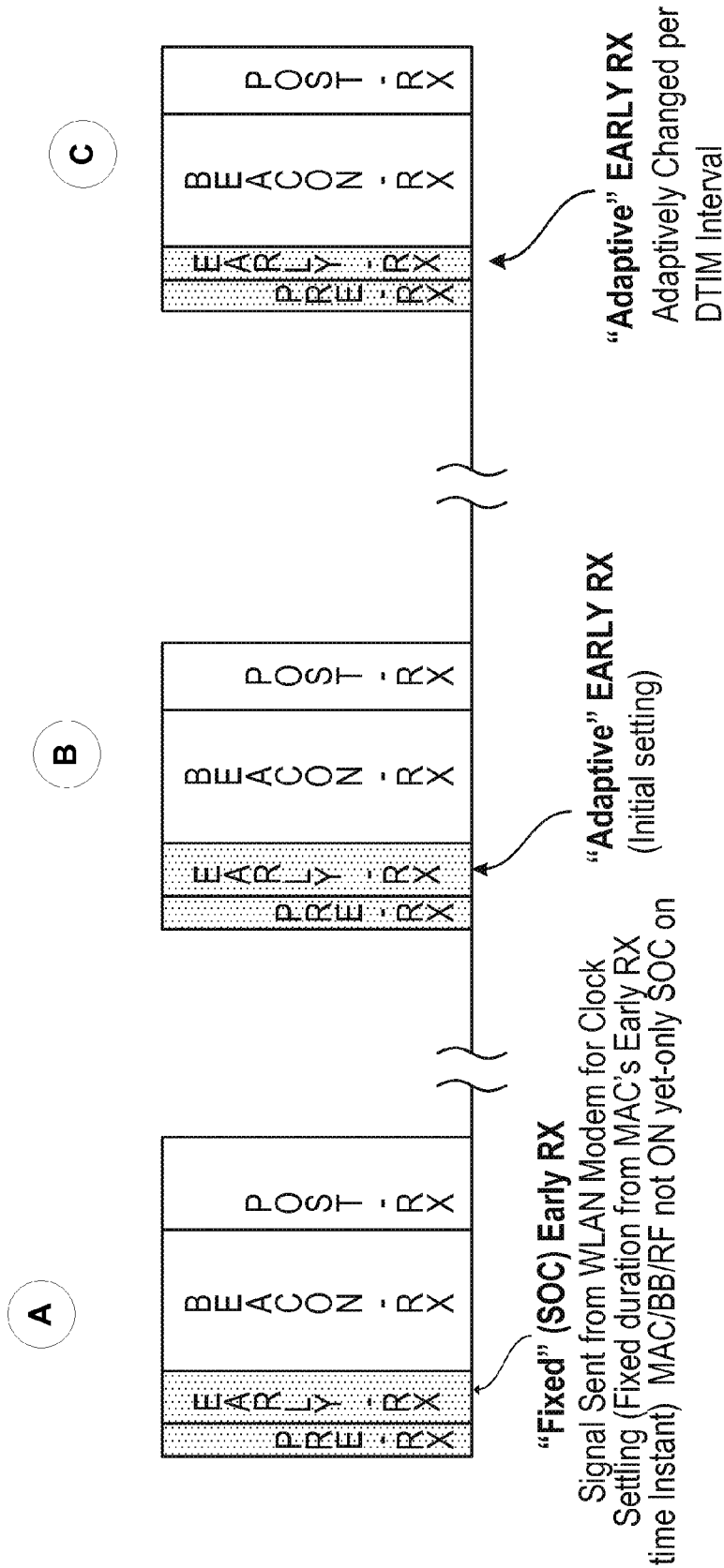
FIG. 3C is a schematic illustrating an adaptive Early-Rx process.

FIG. 3C is a schematic illustrating an adaptive Early-Rx process. In FIG. 3C the x-axis represents time. FIG. 3C shows under "A" an implementation of wake up periods of a chip without using a fixed Early-Rx as defined by a system-on-chip (SOC). During Pre-Rx, the chip begins to wake up and is not ready to receive a beacon. During the fixed Early-Rx period the chip is awake for a fixed amount of time before the beacon is expected to arrive. The chip is also awake for receiving the beacon during Beacon-Rx and a subsequent Post-Rx period, after which the chip may go back to sleep. Under "B" FIG. 3C shoes time periods illustrated with an initial Early-Rx setting of the same time that is used for a the fixed Early-Rx illustrated under A. In some implementations, the initial Early-Rx period can be set to zero and it is increased as needed. Under "C" in FIG. 3C, the same periods are shown as under "B" but now the Early-Rx period has been reduced in duration, for example, by any of the ways discussed herein including but not limited to LPO thermal coefficient, duration of sleep, target beacon miss rate, and a prevalent DTIM value.

Figure 4:
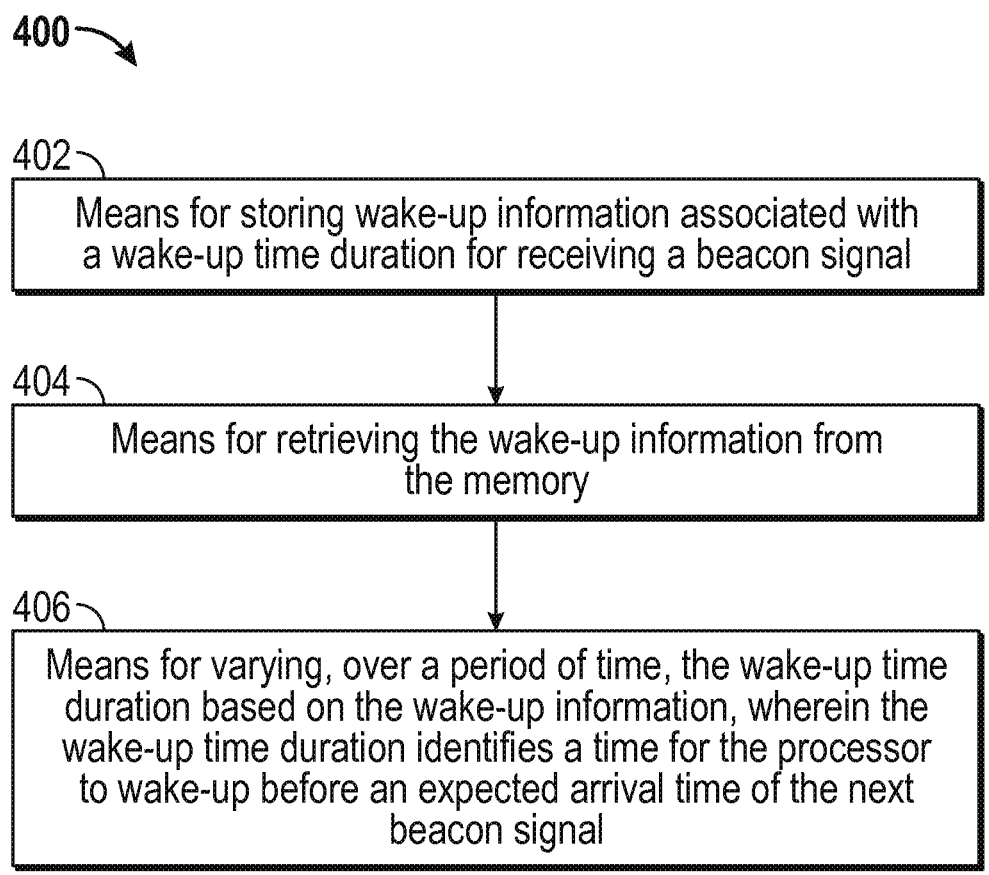
FIG. 4 is a functional block diagram of an exemplary wireless device that may be employed within the wireless communication system of FIG. 1, and perform the process illustrated in FIG. 3A or FIG. 3B.

FIG. 4 is a functional block diagram of an exemplary wireless device 400 that may be employed within the wireless communication system of FIG. 1, and perform the process illustrated in FIG. 3A or FIG. 3B. Block 402 represents means for storing wake-up information associated with a wake-up time duration for receiving a beacon signal. Such means may be memory or a memory unit. The memory may be located within a processor chip or be outside a processor chip. Block 404 represents means for retrieving the wake-up information from the memory. Such means may be a processor coupled to and/or in communication with the memory (or memory unit). Block 406 represents means for varying, over a period of time, the wake-up time duration based on the wake-up information, wherein the wake-up time duration identifies a time for the processor to wake-up before an expected arrival time of the next beacon signal. Such means can include a processor.

Figure 5:
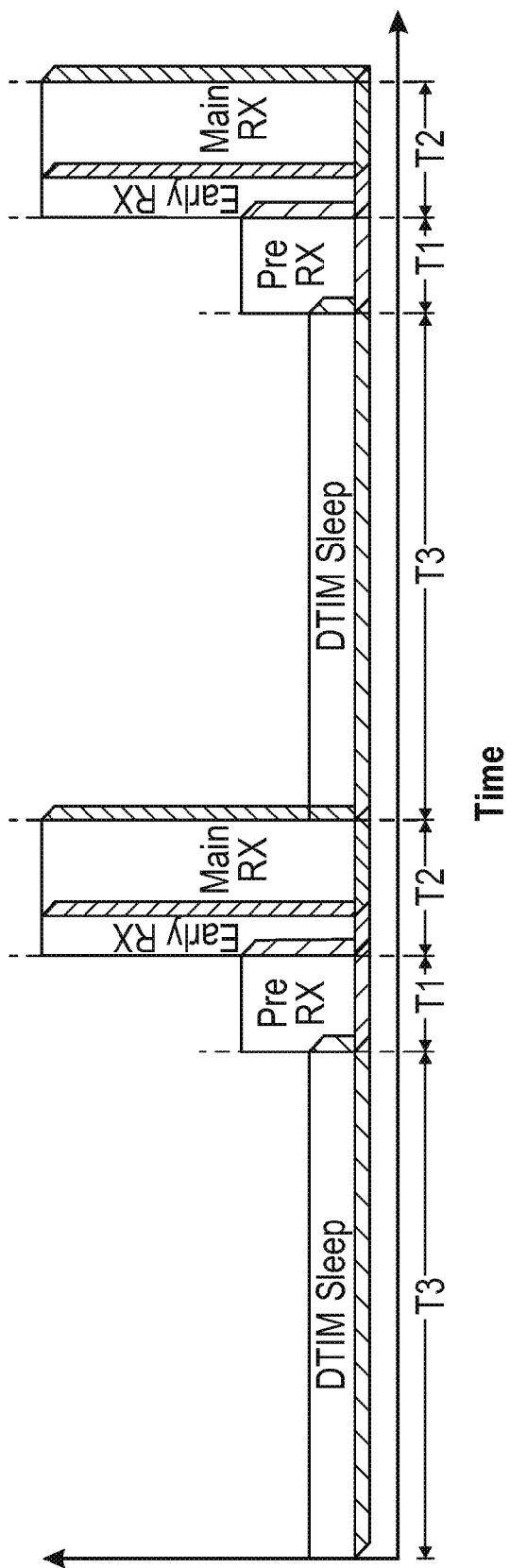
FIG. 5 is a schematic illustrating a graph of power of portions of a delivery traffic indication message (DTIM) Sleep RX cycle over time.

FIG. 5 is a schematic illustrating a graph of power of portions of a DTIM Sleep RX cycle over time, according to some implementations. The x-axis represents time, and the y-axis represents power. Subsequent to the DTIM Sleep portion (time-wise), FIG. 5 illustrates a Pre RX (receive) portion having a duration of T1 is at a power level that is above the power level of the DTIM Sleep portion. In the Pre Rx portion, a processor may be "waking up" which involves powering up. The power illustrated in FIG. 5 for DTIM sleep, Pre Rx, Early Rx, and Main Rx is simplified for the clarity of the illustration, and is intended to generally illustrate the difference in power levels at each of the portions DTIM Sleep, Pre Rx, Early Rx, and Main Rx. After the Pre RX duration during time duration T2 there is an Early RX portion and a Main RX portion at a power level which is higher than the power level during Pre Rx. As described herein, the Early RX portion can be dynamically varied (or adjusted). During the Early Rx portion and the Main Rx portion a device may be awake and ready to receive a beacon.

Figure 6:
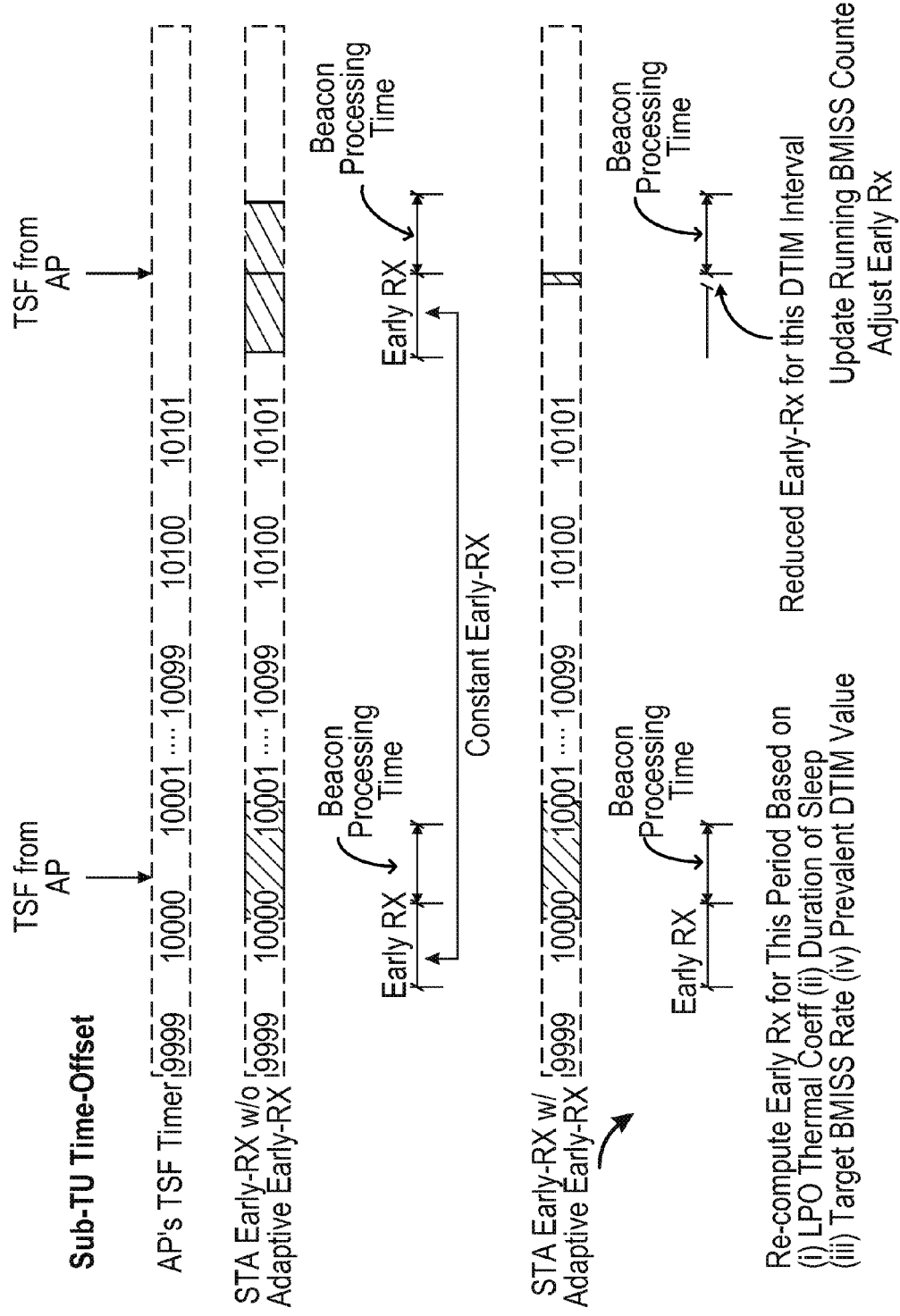
FIG. 6 is a schematic illustrating an example implementation of adaptive Early-Rx.

FIG. 6 is a schematic illustrating an example illustration of an adaptive Early-Rx process. The top graphic illustrates a timeline from the point of view of the AP's TSF timer. The middle graphic illustrates a station having a fixed Early-Rx, that is, an Early-Rx that is set at a certain duration (that is, it is not adaptive/dynamic). The bottom graphic illustrates a station having an Early-Rx with adaptive Early-Rx, such as is described herein. As can be seen in FIG. 6, at 10100 the station without an adaptive Early-Rx process has a large needlessly Early-Rx (which over time consumes a lot of power) while the station with an adaptive Early-Rx first has a large Early-Rx but it is reduced based on one or more factors including but not limited to LPO thermal coefficient, duration of sleep, target beacon miss rate, and/or a prevalent DTIM value. One or more factors as described herein, for example as described relative to FIG. 3A, can be used to dynamically adjust an Early-Rx to greatly lower power consumption while still meeting operational performance criteria.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (for example, a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
    a memory unit configured to store wake-up information associated with a wake up time duration for receiving a beacon signal;
    a missed beacon counter configured for incrementing based on a result of a channel adversity condition; and
    a processor operationally coupled to the memory unit and the missed beacon counter, the processor configured to:
    retrieve the wake-up information from the memory,
    vary, over a period of time, the wake-up time duration based on the wake-up information and the channel adversity condition,
    wherein the wake-up time duration identifies a time for the processor to wake-up before an expected arrival time of the next beacon signal and a time period to remain awake,
    determining, by the processor, a missed beacon signal,
    wherein the missed beacon counter increments when the missed beacon signal is not the result of the channel adversity condition,
    wherein the missed beacon counter does not increment when the missed beacon signal is the result of the channel adversity condition,
    determining, by the processor, a beacon miss rate based on a value of the missed beacon counter,
    increasing, by the processor, the time for the processor to wake-up before an expected arrival time of the next beacon signal when the beacon miss rate is greater than a target beacon miss rate, and
    waking-up, by the processor, based on the increase in the time for the processor to wake-up before an expected arrival time of the next beacon signal.

2. The apparatus of claim 1, wherein the processor is further configured to vary the wake-up time duration based on missed beacon information.

3. The apparatus of claim 1, wherein the wake-up time duration is an Early-Rx parameter.

4. The apparatus of claim 1, wherein the wake-up information includes the target beacon miss rate, and the processor is further configured to determine over a period of time the beacon miss rate and to vary the wake-up time duration based on a comparison of the beacon miss rate and the target beacon miss rate.

5. The apparatus of claim 1, wherein the wake-up information includes the target beacon miss rate, and the processor is further configured to determine over a period of time the beacon miss rate and to increase the wake-up time duration when the beacon miss rate is greater than or equal to the target beacon miss rate.

6. The apparatus of claim 1, wherein the wake-up information includes the target beacon miss rate, and the processor is further configured to determine over a period of time a beacon miss rate and to decrease the wake-up time duration when the beacon miss rate is less than the target beacon miss rate by a defined safety margin.

7. The apparatus of claim 1, wherein the wake-up information includes the target beacon miss rate and a no-adjustment time interval, the no-adjustment time interval defining a period of time during which no adjustments to the wake-up time duration are made, and the processor is further configured to:
    determine over a period of time the beacon miss rate,
    adjust the wake-up time duration based on a comparison of the beacon miss rate and the target beacon miss rate before a no-adjustment time interval expires, and
    when the beacon miss rate is less than the target beacon miss rate.

8. The apparatus of claim 7, wherein the processor is further configured to increase the wake-up time duration when the beacon miss rate is greater than or equal to the target beacon miss rate.

9. The apparatus of claim 7, wherein the processor is further configured to decrease the wake-up time duration when the beacon miss rate is less than the target beacon miss rate.

10. The apparatus of claim 1, wherein wake-up time duration is adjusted in increments of time, each increment being less than or equal to 200 μsec.

11. The apparatus of claim 1, wherein wake-up time duration is adjusted in increments of time, each increment being less than or equal to 100 μsec.

12. The apparatus of claim 1, wherein wake-up time duration is adjusted in increments of time, each increment of time being less than or equal to 100 milliseconds.

13. The apparatus of claim 1, wherein the wake-up information includes the target beacon miss rate, and the processor is further configured to determine over a period of time the beacon miss rate and to iteratively increase the duration of the early wake-up time duration when the beacon miss rate is greater than the target beacon miss rate decrease and iteratively decrease the duration of the early wake-up duration when the beacon miss rate is less than the target beacon miss rate.

14. The apparatus of claim 1, wherein the processor is further configured to, before going to a sleep mode, determine a temperature of the processor and varies the time the processor wakes up based at least in part on the temperature.

15. An apparatus for wireless communication, comprising:
    a memory unit configured to store wake-up information associated with an early wake-up time duration that defines when a processor wakes-up before a beacon signal is expected to be received;
    a missed beacon counter configured for incrementing based on a result of a channel adversity condition; and
    a processor operationally coupled to the memory unit and the missed beacon counter, the processor configured to retrieve the wake-up information from the memory and dynamically determine a wake-up time duration based on at least the wake-up information and the channel adversity condition, wherein the wake-up time duration identifies a time period to remain awake, determining, by the processor, a missed beacon signal, wherein the missed beacon counter increments when the missed beacon signal is not the result of the channel adversity condition, wherein the missed beacon counter does not increment when the missed beacon signal is the result of the channel adversity condition, determining, by the processor, a beacon miss rate based on a value of the missed beacon counter, increasing, by the processor, the time for the processor to wake-up before an expected arrival time of the next beacon signal when the beacon miss rate is greater than a target beacon miss rate, and waking-up, by the processor, based on the increase in the time for the processor to wake-up before an expected arrival time of the next beacon signal.

16. A method of saving power in an apparatus for wireless communication, the method comprising:

storing wake-up information associated with a wake-up time duration for receiving a beacon signal;

retrieving the wake-up information from a memory; and varying, over a period of time, the wake-up time duration based on the wake-up information and a channel adversity condition, wherein the wake-up time duration identifies a time for a processor to wake-up before an expected arrival time of the next beacon signal and a time period to remain awake, determining a missed beacon signal, incrementing a missed beacon counter when the missed beacon signal is not the result of the channel adversity condition and not incrementing the missed beacon counter when the missed beacon signal is the result of the channel adversity condition, determining a beacon miss rate based on a value of the missed beacon counter, increasing the time to wake-up before an expected arrival time of the next beacon signal when the beacon miss rate is greater than a target beacon miss rate, and waking-up based on the increase in the time to wake-up before an expected arrival time of the next beacon signal.

17. The method of claim 16, wherein retrieving the wake-up information comprises an Early-Rx parameter.

18. The method of claim 16, further comprising determining the wake-up time duration based on at least the wake-up information.

19. The method of claim 16, further comprising:

determining, over a period of time, the beacon miss rate, varying the wake-up time duration based on a comparison of the beacon miss rate and the target beacon miss rate, and when the beacon miss rate is less than the target beacon miss rate, determining whether a no-adjustment time interval has expired.

20. The method of claim 19, wherein varying the wake-up time duration comprises increasing the wake-up time duration when the beacon miss rate is greater than or equal to the target beacon miss rate.

21. The method of claim 19, wherein varying the wake-up time duration comprises decreasing the wake-up time duration when the beacon miss rate is less than the target beacon miss rate by a defined safety margin.

22. The method of claim 19, wherein varying the wake-up time duration comprises varying the wake-up time duration based on the target beacon miss rate before a no adjustment time interval expires, the no-adjustment time interval defining a period of time during which no adjustments to the wake-up time duration are made.

23. The method of claim 22, wherein varying the wake-up time duration comprises increasing the wake-up time duration when the beacon miss rate is greater than or equal to the target beacon miss rate.

24. The method of claim 22, wherein varying the wake-up time duration comprises decreasing the wake-up time duration when the beacon miss rate is less than the target beacon miss rate by a defined safety margin.

25. An apparatus for wireless communication, comprising:

means for storing wake-up information associated with a wake-up time duration for receiving a beacon signal;

means for retrieving the wake-up information from a memory;

means for incrementing a missed beacon counter based on a result of a channel adversity condition; and means for varying, over a period of time, the wake-up time duration based on the wake-up information and the channel adversity condition, wherein the wake-up time duration identifies a time to wake-up before an expected arrival time of the next beacon signal and a time period to remain awake, means for determining a missed beacon signal, means for incrementing a missed beacon counter when the missed beacon signal is not the result of the channel adversity condition and not increment the missed beacon counter when the missed beacon signal is the result of the channel adversity condition, means for determining a beacon miss rate based on a value of the missed beacon counter, means for increasing the time to wake-up before an expected arrival time of the next beacon signal when the beacon miss rate is greater than a target beacon miss rate, and waking-up based on the increase in the time to wake-up before an expected arrival time of the next beacon signal.

26. The apparatus of claim 25, wherein means varying the wake-up time duration comprises means for varying the wake-up time duration based on the target beacon miss rate before a no-adjustment time interval expires, the now adjustment time interval defining a period of time during which no adjustments to the wake-up time duration are made.

27. A non-transitory computer-readable medium comprising code that, when executed, causes an apparatus to:

store wake-up information associated with a wake-up time duration for receiving a beacon signal;

retrieve the wake-up information from a memory;

increment a missed beacon counter based on a result of a channel adversity condition; and vary, over a period of time, the wake-up time duration based on the wake-up information and the channel adversity condition, wherein the wake-up time duration identifies a time for a processor to wake-up before an expected arrival time of the next beacon signal and a time period to remain awake, determine by the processor, a missed beacon signal, increment a missed beacon counter when the missed beacon signal is not the result of the channel adversity condition and not increment the missed beacon counter when the missed beacon signal is the result of the channel adversity condition, determine a beacon miss rate based on a value of the missed beacon counter, increase the time for the processor to wake-up before an expected arrival time of the next beacon signal when the beacon miss rate is greater than a target beacon miss rate, and waking-up the processor based on the increase in the time for the processor to wake-up before an expected arrival time of the next beacon signal.

28. A wireless communications device comprising:

a missed beacon counter configured for incrementing based on a result of a channel adversity condition; and a processor configured to vary, over a period of time, a wake-up time duration, the wake-up time duration identifying a time for the processor to wake-up before an expected arrival time of a next beacon signal and a time period to remain awake, wherein the variation of the wake-up time is based at least in part on temperature information and the channel adversity condition, determining, by the processor, a missed beacon signal, wherein the missed beacon counter increments when the missed beacon signal is not the result of the channel adversity condition, wherein the missed beacon counter does not increment when the missed beacon signal is the result of the channel adversity condition, determining, by the processor, a beacon miss rate based on a value of the missed beacon counter, increasing, by the processor, the time for the processor to wake-up before an expected arrival time of the next beacon signal when the beacon miss rate is greater than a target beacon miss rate, and waking-up, by the processor, based on the increase in the time for the processor to wake-up before an expected arrival time of the next beacon signal.

* * * * *